UNITED STATES PATENT OFFICE.

EDMUND O. BAUJARD, OF AUBERVILLIERS, FRANCE, ASSIGNOR TO JOHN W. MACKAY, OF VIRGINIA CITY, NEVADA.

EXTRACTING GLYCERINE.

SPECIFICATION forming part of Letters Patent No. 278,849, dated June 5, 1883.

Application filed May 11, 1883. (No specimens.)

*To all whom it may concern:*

Be it known that I, EDMUND O. BAUJARD, of Aubervilliers, Seine, France, have invented an Improvement in Extracting Glycerine, of which the following is a specification.

My process purposes to treat all fatty neutral substances of animal or vegetable origin so as to divide them rapidly and economically, and after eliminating the glycerine in a condition of purity sufficient to utilize it directly for manufacturing dynamite to employ said fatty neutral substances immediately for manufacturing stearic acid and candles as well as soap. This process is based, first, on the action produced on all fatty neutral substances by oxygen and hydrogen when in their primitive state; second, on the property possessed by metallic zinc, when in a condition of proper division, to decompose the water under the influence of heat.

In carrying out this process I take some pure metallic zinc and proceed as follows: In a closed vessel of a digester I introduce a suitable charge of fatty neutral substances with about thirty per cent. of its volume of water. I now introduce two or three thousandths of the weight of fatty substances used of pure metallic zinc. This zinc is pulverized or reduced by a file into small particles and placed in water in a pail or other suitable vessel. The contents of the vessel are stirred to keep the particles of the zinc separated or divided. The contents of the vessel while under the influence of the stirring are then introduced into the digester. They will preferably be introduced into the digester in small quantities at a time. They may be advantageously introduced through a funnel having its nozzle furnished with a cock and located above the level of the charge in the digester. As each quantity of the zinc and water is introduced a sufficient quantity of steam is let into the digester to agitate the charge and disseminate the zinc throughout the charge. The steam admitted for this purpose is admitted into the lower part of the digester, so as to stir up the charge effectually. If desirable, steam may be admitted in this way before any quantity of zinc and water is introduced, and may be admitted in a constant stream until all the zinc and water shall have been introduced. After the zinc and water shall have been introduced the cock of the said funnel will be closed and steam will be let on more fully until the desired pressure within the digester is attained. A slight escape of the steam from the upper part of the digester is provided for, so that the incoming steam will always keep the charge in the digester stirred up or in a state of turmoil. Under the influence of the heat derived from the steam a portion of the water in the digester is decomposed. The oxygen and hydrogen in their primitive state exercise their action on the fatty substance in dividing it so much more rapidly that said fatty substance is quickly brought to a state of division. This is aided by the mechanical or stirring action of steam. If the steam is not introduced, so as to keep the charge stirred during and after the introduction of the zinc and water, any mechanical contrivance may be employed for stirring or agitating the charge. When this division occurs volatile acids contained in the fatty substances are set at liberty. I can easily ascertain when they are set at liberty by applying to an escapement of steam from the digester a strip of litmus-paper, for the presence of the volatile acids immediately turns that red. A maximum pressure of about one hundred and fifty pounds will suffice for dividing fatty substances such as are employed in stearine-factories. The division will be effected in about from four to five hours.

In soap-factories, where the fatty substances employed abound less in concrete acids, the division may be effected in about three hours at a pressure of about one hundred and twenty-five pounds in the digester. After saponification has taken place in the digester I blow off the contents of the digester into a suitable lead-lined tank, and when the water has been completely separated I run it into a receptacle for subsequent evaporation, and I run the fat acids into another receptacle for further treatment.

To sum up, the following are the benefits and new results to be derived from the use of this process: first and foremost, the low price of metallic zinc almost nullifies the expense, and, moreover, does away with the inconvenience of metallic oxides, which all, in commercial centers, contain chlorides and salts, both soluble in glycerine, which renders the latter improper for manufacturing dynamite. When lime is used in the ordinary processes it is partly soluble in the glycerine; moreover, it contains chlorides and salts soluble in glycerine, thus producing impure glycerine, unsuitable, without refining, for use in manufacturing dynamite. The calcareous soap obtained by the lime process must be decomposed by sulphuric acid. The sulphate of lime which results from this treatment necessitates numerous washings, which are not sufficient to eliminate all the fatty acids interposed, thus a considerable expense, due to the use of sulphuric acid, the loss of time, and loss of fatty substance incident to the use of the lime process, I avoid. By my process time is also economized, owing to the fact that the treatment by the digester lasts but about one-half the time of any of the ordinary processes. Consequently the same digester is adapted to do double the work ordinarily performed in a given time by a digester. Much time is also saved by my process, because a plain washing with acidulated water will suffice to eliminate any particle of zinc which might remain in suspension in the fatty acids. I get as large a yield of glycerine as can be obtained by any other process, and I produce glycerine in a sufficient condition of purity for being used in making dynamite, because through my process I avoid introducing any of the elements which in all ordinary processes contaminate the glycerine.

I will add that after washing, the fatty acids obtained are very bright in color and crystallize and press very easily.

The soap-manufacturers generally lose the glycerine, which is carried off with the spent lye. Those who endeavor to extract it by a preliminary saponification in a digester with the intervention of metallic oxides not only obtain an impure glycerine containing a quantity of chlorides and salts, unfitted, without refining, for use in manufacturing dynamite, but they also obtain a soap the base of which is with difficulty displaced by the lye. The soap obtained is incomplete and dull in color. By my process the manufacturer will, after about three hours' treatment of a charge in a digester at a pressure of about one hundred and twenty-five pounds, extract eight to nine per cent. of practically-pure glycerine. The soap obtained will be much more desirable than that obtained by the ordinary processes.

What I claim as my invention, and desire to secure by Letters Patent, is—

1. The process of extracting glycerine from fatty substances, consisting in placing the fatty substances, with a suitable quantity of water, in a digester, in agitating the mass, in pulverizing or reducing zinc into small particles, in placing the particles of zinc in water, in stirring the zinc and water to keep the particles of zinc separated, and in introducing the zinc and water, while under the influence of the stirring, into the digester, substantially as specified.

2. The process of extracting glycerine from fatty substances, consisting in placing the fatty substances, with a suitable quantity of water, in a digester, in agitating the mass by admitting a small stream of steam into the lower portion, in placing zinc reduced to small particles in water, in stirring the zinc and water to keep the particles of zinc separated, in introducing the zinc and water, while under the influence of the stirring, into the digester, in subsequently admitting a larger stream of steam into the lower portion of the digester to raise the pressure therein, and in allowing a slight escape of steam from the digester, so that the incoming steam will agitate the contents of the digester, substantially as specified.

E. O. BAUJARD.

Witnesses:
T. J. KEANE,
JAMES R. BOWEN.